United States Patent [19]

Gautier

[11] Patent Number: 5,016,520

[45] Date of Patent: May 21, 1991

[54] PROCESS FOR ADJUSTING THE VALUE OF THE JUMP OF A BRAKE BOOSTER

[75] Inventor: Jean-Pierre Gautier, Aulnay Sous Bois, France

[73] Assignee: Bendix Europe Services Techniques, Drancy, France

[21] Appl. No.: 519,694

[22] Filed: May 7, 1990

[30] Foreign Application Priority Data

May 31, 1989 [FR] France ............... 89 07147

[51] Int. Cl.$^5$ ............................................. F15B 9/00
[52] U.S. Cl. ............................ 91/471; 91/369.1; 91/369.2; 91/369.3; 91/369.4; 91/376 R; 60/327; 60/554
[58] Field of Search ............... 91/369.1, 369.2, 376 R, 91/377, 358 R, 369.3, 471, 369.4; 60/327, 554

[56] References Cited

U.S. PATENT DOCUMENTS

| | | | |
|---|---|---|---|
| 4,354,423 | 10/1982 | Ohmi et al. | 91/369 A |
| 4,545,206 | 10/1985 | Kobayashi | 60/554 |
| 4,763,561 | 8/1988 | Gautier | 91/369.1 X |
| 4,817,500 | 4/1989 | Gautier | 91/376 R |
| 4,934,249 | 6/1990 | Gautier et al. | 91/376 R X |

FOREIGN PATENT DOCUMENTS 2834510 7/1979 Fed. Rep. of Germany .
2080457 2/1982 United Kingdom .

Primary Examiner—Edward K. Look
Assistant Examiner—Todd Mattingly
Attorney, Agent, or Firm—Larry J. Palguta; Ken C. Decker

[57] ABSTRACT

The process is for adjusting the value of the jump of a brake booster, in which are movably mounted a hollow boosting piston, a control rod carrying a plunger seated in the piston and a push rod, boosting means being controlled as a result of a forward movement of the plunger and their effect being to move the piston forwards, a reaction disc being interposed between an annular front face of the piston and a rear face of the push rod, the booster being intended for actuating a master cylinder. The process involves the following steps: determining the force which the booster must exert on the push rod in order to actuate the master cylinder, exerting this force on the push rod equipped with the reaction disc, measuring the deformation of the central part of the rear face of the reaction disc, measuring the distance between the annular front face of the piston and the front face of the plunger when the boosting means are in their position of equilibrium, and making this distance equal to the deformation of the central part of the rear face of the reaction disc.

8 Claims, 4 Drawing Sheets

PROCESS FOR ADJUSTING THE VALUE OF THE JUMP OF A BRAKE BOOSTER

BACKGROUND OF THE INVENTION

The invention relates to brake boosters and applies more particularly to the adjustment of the jump of such boosters.

A brake booster generally comprises a control rod which moves forwards when the vehicle driver actuates the brake pedal. This movement of the control rod is transmitted to a plunger which actuates boosting means. These boosting means generally comprise a three-way valve, the actuation of which makes it possible to break communication between a front chamber and a rear chamber of the booster and connect the latter chamber to the atmosphere. Because the front chamber is normally under a vacuum, a boosting force is thus exerted on the piston which separates the two chambers. The piston then moves forwards, thereby acting on a push rod serving for actuating the master cylinder of the brake circuit.

Conventionally, the piston serving for transmitting the boosting force to the push rod acts on the latter via a reaction disc made of a deformable material, such as an elastomer. At rest, there is a small play between the front end of the plunger and the reaction disc. When the vehicle driver begins to actuate the brake pedal, this small play allows the plunger to move forwards immediately in order to control the boosting means and ensure an immediate response of the brakes.

The effect of transmitting the boosting force exerted on the piston to the push rod via the reaction disc is to compress the peripheral part of the reaction disc axially in proportion to the boosting force. The result of this compression of the peripheral part of the reaction disc is a deformation of the central part of this disc towards the front face of the plunger. When the boosting force exceeds a particular threshold, the play initially present at rest between the reaction disc and the front face of the plunger is taken up, so that the plunger is in contact with the reaction disc and the latter returns to the brake pedal a reaction force representing the braking force exerted on the brakes of the vehicle. This well-known arrangement enables the driver to proportion the braking force which he exerts on the pedal as a function of the resistance which he encounters, this resistance increasing with this force.

It emerges from the foregoing explanation that the reaction at the pedal begins to occur only when the boosting force generated as a result of the actuation of the brake pedal exceeds a particular threshold. This threshold is called the "jump" of the booster. It is an important characteristic of the booster. In fact, although the existence of the jump is necessary to ensure an immediate response of the brakes when the pedal is actuated, the manufacturers of motor vehicles usually wish the value of this jump to remain within particular limits, so that the boost does not reach too high a value without an increase in the reaction at the pedal.

However, especially because of the production tolerances of the various component parts of the booster, there can be appreciable differences in the value of the jump from one booster to another. Likewise, the master cylinders intended to be actuated by the push rod of the booster themselves experience a spread of their characteristics, and the performances of a brakebooster/master cylinder assembly can therefore vary within an excessively wide range. Moreover, at the present time there is no practical means for controlling or adjusting the value of the jump of the booster, and consequently the above-mentioned requirements are not always satisfied, except by resorting to complex checks involving a high outlay.

SUMMARY OF THE INVENTION

It is therefore specifically an object of the present invention to provide a process for adjusting the value of the jump of a booster, which can be carried out in a unitary manner, that is to say the jump of each booster can be set independently of the jump of another booster, in a simple way and without an increase in the cost of the booster so adjusted.

Another object of the invention is to adjust the value of the jump of a booster as a function of the production tolerances of the booster and of the master cylinder which will be associated in a hydraulic brake circuit, in order to pair them together so as to obtain identical performances from one booster/master cylinder assembly to another.

According to the present invention, there is provided a process for adjusting the value of the jump of a brake booster, in which are movably mounted a hollow boosting piston, a control rod carrying a plunger seated in the piston and a push rod, boosting means being controlled as a result of a forward movement of the plunger and their effect being to move the piston forwards, a reaction disc being interposed between an annular face of the piston and a rear face of the push rod, the booster being intended for actuating a master cylinder, the process being characterized in that it involves the following steps:

determining the force which the booster must exert on the push rod at the moment of the jump in order to actuate the master cylinder, exerting this force on the push rod equipped with the reaction disc, measuring the deformation of the central part of the rear face of the reaction disc, measuring the distance between the annular front face of the piston and the front face of the plunger when the boosting means are in their position of equilibrium, and making this distance equal to the deformation of the central part of the rear face of the reaction disc.

BRIEF DESCRIPTION OF THE DRAWINGS

The invention will now be described by way of example with reference to the accompanying drawings in which.

DETAILED DESCRIPTION OF THE INVENTION

Figure 1:
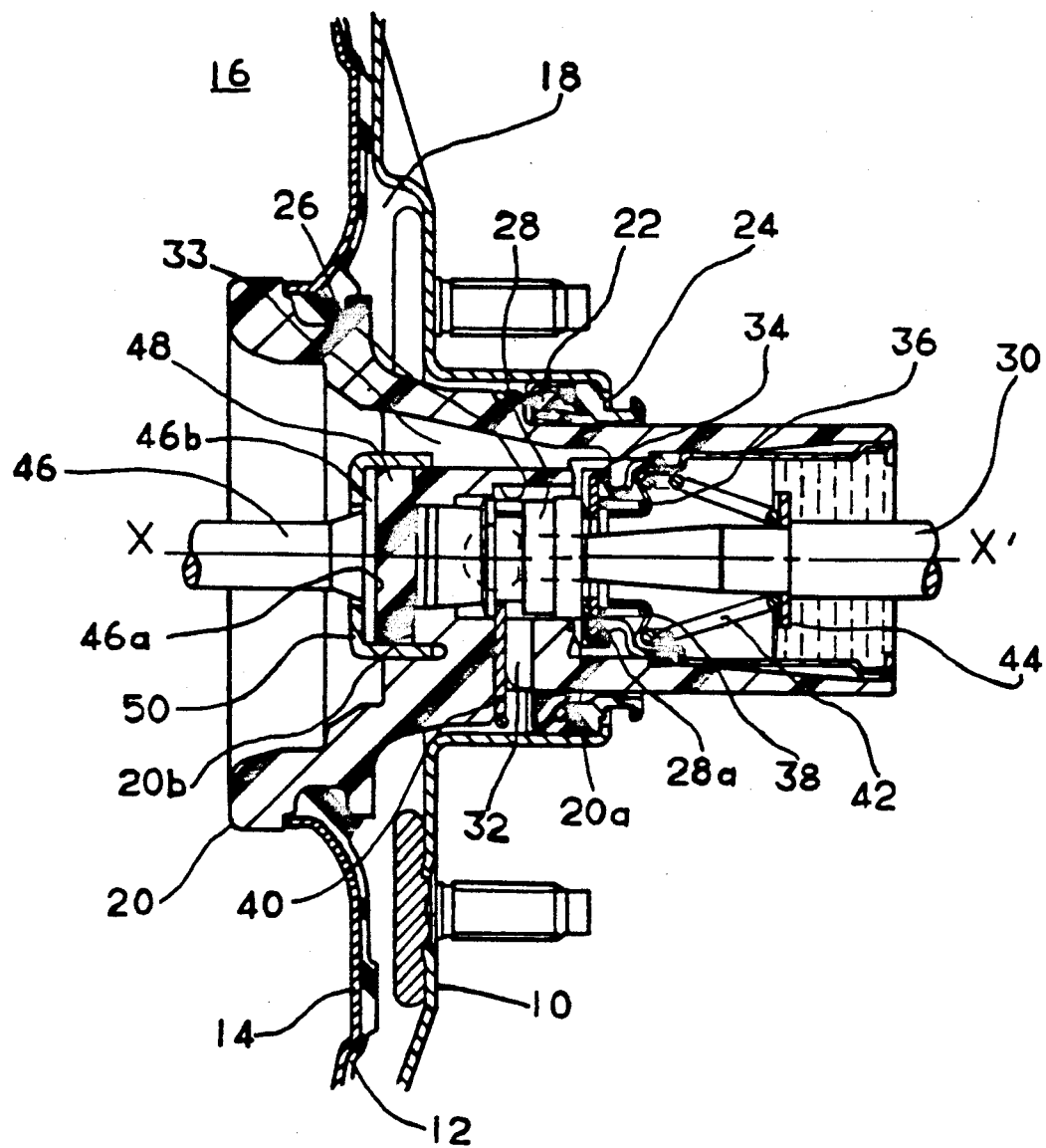
FIG. 1 is a side view in longitudinal section, illustrating the central part of a brake booster, the value of the jump of which has been adjusted according to the invention.

FIG. 1 illustrates part of a brake booster intended to be arranged in a conventional way between the brake pedal of a vehicle and the master cylinder controlling the hydraulic brake circuit of this vehicle. By convention, that part of the booster facing the master cylinder is called the front of the booster and that part facing the brake pedal is called the rear of the booster.

The booster of FIG. 1 comprises a shell-shaped outer casing 10 having a symmetry of revolution about an axis X—X. Only the rear central part of this casing 10 is shown in FIG. 1.

A flexible elastomeric diaphragm 12 reinforced in its central part by a metal supporting disc 14 defines, within the space delimited by the casing 10, a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow boosting piston 20 arranged along the axis X—X of the booster. This hollow piston 20 is extended rearwards in the form of a tubular part which passes sealingly through the rear wall of the casing 10. The sealing of this passage is ensured by a reinforced annular gasket 22 which is fastened by means of a ring 24 in a tubular central part extending the rear wall of the casing 10 rearwards.

A compression spring (not shown) interposed between the piston 20 and front wall (not shown) of the outer casing 10 normally keeps the piston in a rear rest position, illustrated in FIG. 1, in which the rear chamber 18 represents its minimum volume and the front chamber 16 its maximum volume.

In the central part located between the tubular rear part and the front part in which the diaphragm 12 is fastened, the piston 20 has a stepped bore 26, in which is slidably received a plunger 28 likewise possessing a symmetry of revolution about the axis X—X. The front end of a control rod 30 of the booster, likewise arranged along the axis X—X, is mounted pivotably by means of a knuckle in the plunger 28. The rear end (not shown) of this rod 30 which projects outside the tubular part of the piston 20 is controlled directly by the brake pedal of the vehicle.

The annular space delimited between the control rod 30 and the tubular part of the piston 20 opens outwards at the rear of the booster. Towards the front, the same annular space can communicate with the rear chamber 18 via a radial passage 32 formed in the central part of the piston, when boosting means controlled by the plunger 28 are actuated.

Conventionally, these boosting means comprise a three-way valve possessing an annular shutter 34 mounted in the tubular part of the piston and two annular valve seats 20a and 28a formed respectively on the central part of the piston 20 and on the plunger 28.

The shutter 34 forms the front end of smaller diameter of a flexible elastomeric sleeve, the rear end of which terminates in a bead mounted sealingly inside the tubular part of the piston 20. This bead is held in place by a metal cup 36, on which bears a compression spring 38 tending to move the shutter 34 forwards.

The annular valve seat 28a is formed on the rear end face of the plunger 28. In a comparable way, the annular valve seat 20a is formed on the rear end face of the central part of the piston 20 round the seat 28a. According to the position of the plunger 28 inside the piston 20, this arrangement allows the shutter 34 constantly to bear sealingly against at least one of the valve seats 28a and 20a under the action of the spring 38.

A second passage 33 is formed in the central part of the piston 20 approximately in parallel with its axis X—X, in order to put the front chamber 16 of the booster in communication with an annular chamber formed round the shutter 34, on the inside of the tubular part of the piston. When the plunger 28 occupies its rear rest position, illustrated in FIG. 1, in which the shutter 34 bears sealingly on the seat 28a of the plunger and is set apart from the seat 20a of the piston, the front and rear chambers 16 and 18 of the booster thus communicate with one another via the passages 33 and 32.

In a way known per se, at least one stop member 40 mounted in the central part of the piston 20 delimits the axial stroke of the plunger 28 within the latter. The plunger 28 is normally kept in its rear rest position defined by the member 40, by means of a compression spring 42 interposed between the cup 36 and a washer 44, itself bearing on a shoulder formed on the control rod 30.

The piston 20, in its central part, has an annular front face 20b, at the center of which the bore 26 opens out. This annular front face 20b of the piston 20 acts on a rear face 46b of a push rod 46 via a reaction disc 48 made of a deformable material, such as an elastomer. More specifically, the push rod 46 and the reaction disc 48 are arranged along the axis X—X of the booster, in the extension of the control rod 30 and of the plunger 28.

Figure 2:
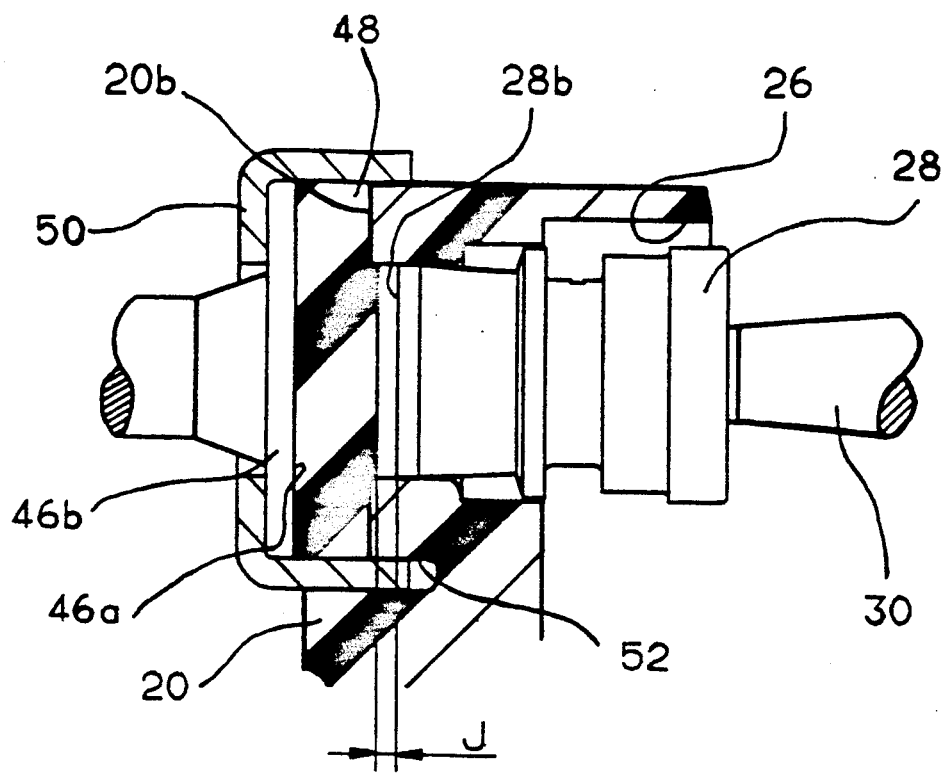
FIG. 2 is a view in longitudinal section, showing on a larger scale the mounting of the reaction disc on the piston of the booster.

As illustrated more clearly in FIG. 2, the rear surface 46a of the push rod 46 is formed on a disc-shaped plate 46b forming the rear end of the rod 46. The plate 46b and the reaction disc 48 are covered by a cap 50 centred on the axis X—X of the booster and interacting with an annular groove 52 formed on the central part of the piston 20 round the annular front face 20b of the latter.

If $F_E$ designates the force exerted on the control rod 30 at the inlet of the booster and $F_S$ denotes the force exerted by the push rod 46 at the outlet of the booster, the functioning of the latter will now be described by reference to the curve of FIG. 3.

When the booster is installed on a vehicle, the front chamber 16 communicates permanently with a vacuum source.

In the first stage, the effect of the depression of the brake pedal by the driver is to equal the prestressing force of the spring 42, less the prestressing force of the spring 38. During the slight movement which follows, the front and rear chambers 16 and 18 of the booster are thus isolated from one another. In this first phase of the actuation of the booster, corresponding to the segment OA in FIG. 3, the force exerted on the control rod 30 does not generate any force on the push rod 46 at the outlet of the booster.

Figure 3:
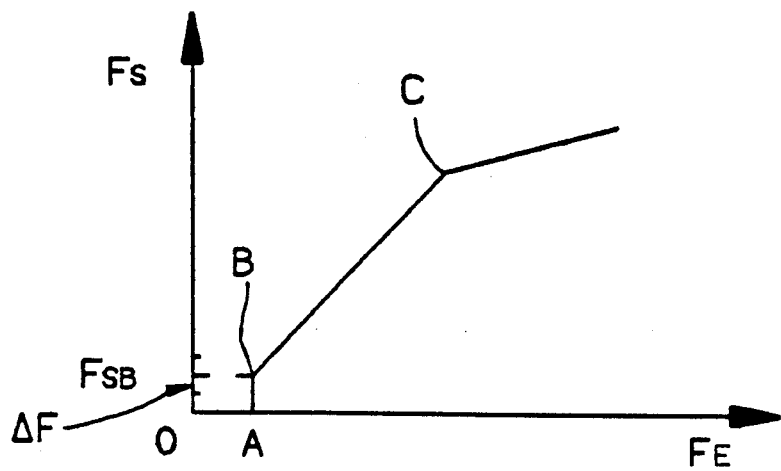
FIG. 3 is a curve representing diagrammatically the change in the force exerted on the push rod at the booster outlet as a function of the force exerted on the control rod at the booster inlet.

In a second phase of the actuation of the brake, corresponding to the segment AB in FIG. 3, the plunger 28 is moved sufficiently forwards for the shutter 34 to be in sealing contact with the seat 20a of the piston and set apart from the seat 28a of the plunger. Under these conditions, the rear chamber 18 of the booster is isolated from the front chamber 16 and communicates with the atmosphere. A boosting force is thus generated, and this tends to move the piston 20 forwards. This movement is transmitted to the push rod 46 by the reaction disc 48.

During this second phase of the actuation of the brakes, the boosting force exerted by the piston 20 does not deform the reaction disc 48 sufficiently for the latter to fill completely the space corresponding to the play J separating it initially from the plunger 28. Consequently, the outlet force $F_S$ exerted on the master cylinder by the push rod 46 increases abruptly to the value $F_{SB}$ corresponding to the point B in FIG. 3, whilst the force exerted on the control rod 30 remains unchanged.

The point B in FIG. 3 corresponds to the threshold at which the boosting force generated in the booster and exerted on the reaction disc 48 by the piston 20 becomes sufficient to ensure that the central part of the reaction disc comes in contact with the front face 28b of the plunger 28, that is to say when the play J is taken up. The length of the segment AB corresponds to the jump of the booster.

In a third phase of the actuation of the brake, corresponding to the segment BC in FIG. 3, any increase in the force exerted by the driver on the control rod 30 causes an increase in the boosting force exerted on the piston, and this results in an increase in the pedal reaction exerted by the disc 48 and the plunger 28, then in contact with one another.

During the second and third phases, the front face of the shutter 34 and the seats 20a and 28a are virtually aligned with one another. This position is called the "position of equilibrium".

Beyond the point C in FIG. 3, the pressure prevailing in the rear chamber 18 of the booster is equal to the atmospheric pressure, and an increase in the boosting pressure is no longer possible. The increase in the outlet force exerted on the master cylinder by the push rod 46 is then substantially equal to the increase in the force exerted by the driver on the brake pedal. The seat 28a is then clearly set apart from the shutter 34.

As already mentioned, depending on the production tolerances of the various component parts of the booster and of the materials constituting the reaction disc, there can be appreciable differences in the value of the jump from one booster to another, and for the same inlet force used on different boosters an outlet force $F_{SB}+F$ will be obtained.

Figure 4:
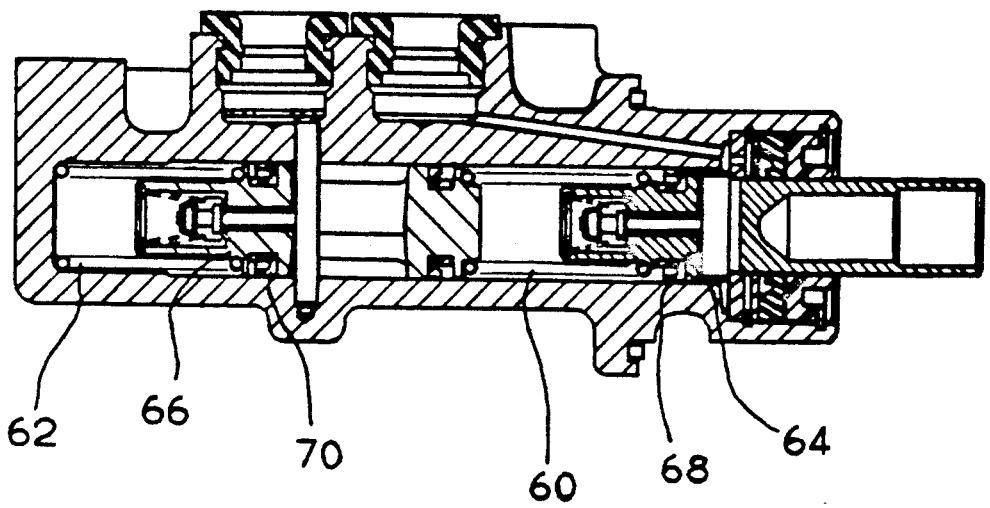
FIG. 4 is a view in longitudinal section of a master cylinder of conventional design.

Likewise, the master cylinders capable of being actuated by the push rod of the booster themselves have production tolerances in their components. If $F_S$ denotes the force exerted by the push rod of the booster at the inlet of the master cylinder and P denotes the hydraulic pressure generated in the brake circuit by the master cylinder, the functioning of the master cylinder will now be described by reference to FIG. 4, illustrating a master cylinder of conventional design, and to the curve of FIG. 5.

In a first stage, the effect of the force exerted on the master cylinder by the push rod 46 of the booster is to equal the calibration at rest of the springs 60 and 62 of the pistons 64 and 66 and to overcome the friction of the cups 68 and 70. In this first phase of the actuation of the master cylinder, corresponding to the segment OD in FIG. 5, the force exerted by the push rod 46 of the booster does not generate any hydraulic pressure in the brake circuit.

Figure 5:
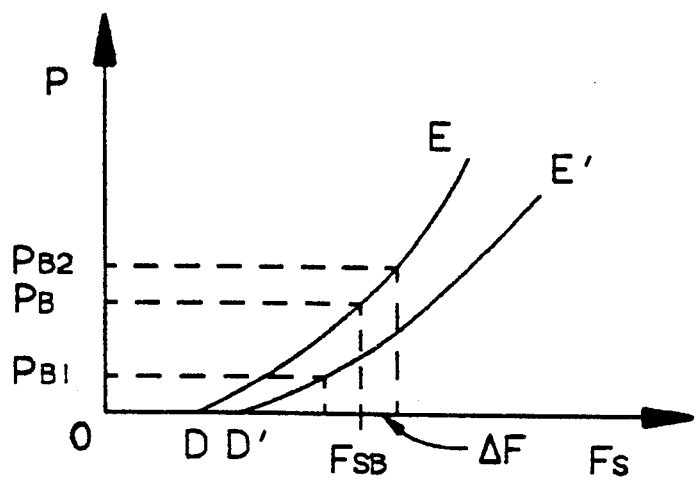
FIG. 5 is a curve representing diagrammatically the change in pressure at the outlet of a master cylinder as a function of the force exerted in order to actuate this master cylinder.

In a second phase of the actuation of the master cylinder, corresponding to the part DE of the curve of FIG. 5, the valves for the refeeding of the master cylinder are closed and the pressure begins to increase in the brake circuit. The segment OD will be of greater or lesser length, depending on the production tolerances of the master cylinder. Likewise, the slope of the part DE will be more or less pronounced, depending on the rigidity of the springs 60 and 62 and on the friction of the cups 68 and 70, and for another master cylinder there will be, for example, a curve OD'E'.

Consequently, for the value $F_{SB}+F$ of the force exerted on the master cylinder, corresponding to the jump of the booster, a pressure $P_B$ will be generated in the brake circuit. It will therefore be appreciated that the spread of characteristics between different master cylinders is added to that of the characteristics between different boosters, so that the same force exerted on the brake pedal by the driver will generate, in the brake circuit, a hydraulic pressure variable between unacceptable values, and in particular the pressure generated by a master cylinder during the jump of a booster with which it is associated can vary between the values $P_{B1}$ and $P_{B2}$ which can be outside the accepted values.

It should be noted that the curves of FIGS. 3 and 5 are known per se and have been mentioned here only better to illustrate the disadvantages of the prior art, as has the master cylinder shown in FIG. 4.

The present invention provides an adjustment process for reducing or even cancelling the range of variation of the hydraulic pressures generated by a master cylinder actuated by a booster for the same force exerted on the control rod of this booster, especially during the jump of this booster.

Figure 6:
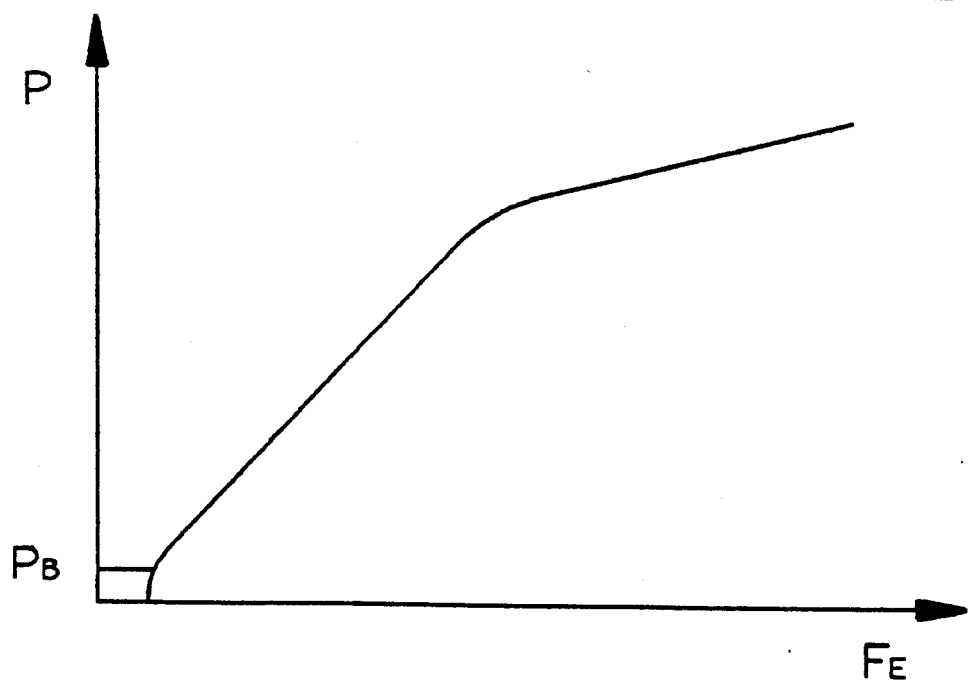
FIG. 6 is a curve representing diagrammatically the change in pressure at the outlet of a master cylinder as a function of the force exerted at the inlet of the booster actuating this master cylinder.

More specifically, it is desirable that a booster/master cylinder assembly should have, during operation, definite characteristics which can be summarized by the curve of FIG. 6 which gives the change in the pressure at the outlet of the master cylinder as a function of the force exerted at the inlet of the booster actuating this master cylinder, and that these characteristics should be reproduced identically for such assemblies manufactured in series.

As mentioned above, the decisive characteristic of such an assembly is the rise in hydraulic pressure at the outlet of the master cylinder during the jump of the booster.

According to the invention, after the pressure $P_B$, which a master cylinder actuated by a booster must supply during the jump of the latter, has been determined, first of all the curve of FIG. 5, giving the pressure which the master cylinder supplies as a function of the force with which it is actuated, is determined on the latter, and for example the curve ODE is obtained. The force $F_{SB}$ which this booster would have to exert on the master cylinder and which corresponds to the value of the jump of the booster is easily deduced from the value of the pressure $P_B$ to be obtained.

Figure 7:
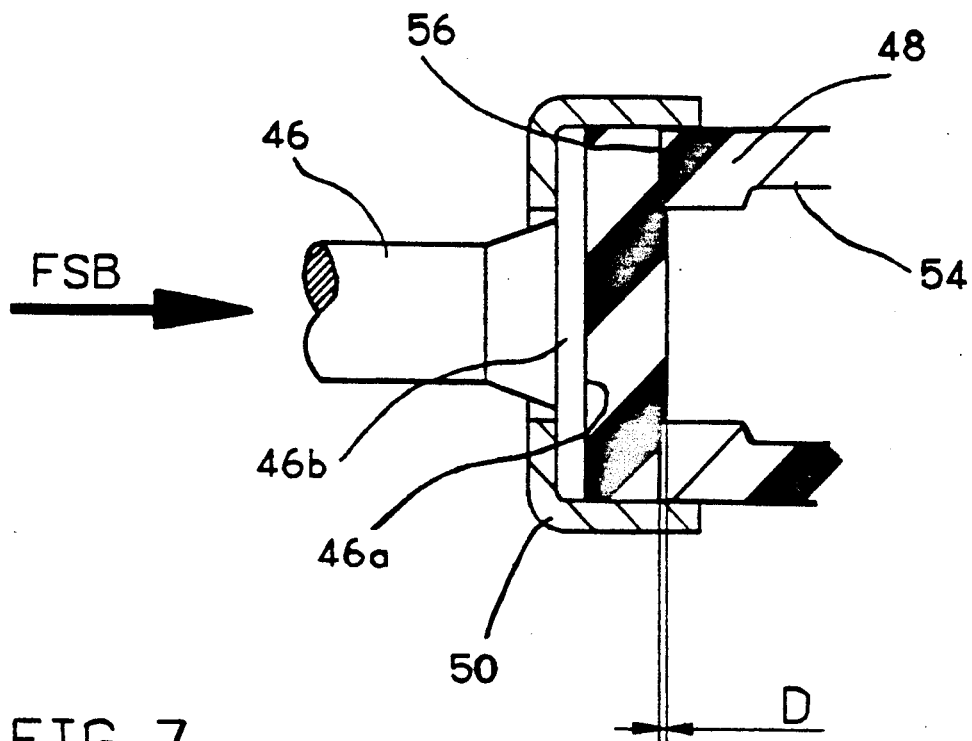
FIG. 7 is a view in longitudinal section, showing the rear end of the push rod equipped with its reaction disc bearing on the piston of the booster.

The push rod 46 equipped with the reaction disc 48 and with the cap 50 is arranged on a base 54 (FIG. 7) having an annular face 56 identical to the annular front face 20b of the piston 20 of the booster which will receive the push rod 46.

A force F equal to the force $F_{SB}$ determined above is then exerted on the push rod 46 towards the base 54 which is kept stationary. The deformation of the central part of the rear face of the reaction disc 48 within the base 54 is then measured, this being equal to the distance D between the plane containing the annular face 56 and the plane parallel to the preceding one and tangent to that part of the disc 48 furthest away from the rear face 46a of the push rod 46.

It is clear from the foregoing explanations that this distance D is that at which the play J between the plunger 28 and the reaction disc 48 shall be cancelled when the boosting force, exerted in the booster which will receive the push rod 46 and the reaction disc 48, reaches the value $F_{SB}$ corresponding to the desired jump of the booster.

Under these conditions, the penetration of the plunger 28 into the bore 26 of the piston 20 must therefore be such that, for this distance D between the plane containing the front face 28b of the plunger 28 and the plane containing the annular front face 20b of the piston 20, the three-way valve located behind the plunger 28 is in the position of equilibrium.

Figure 8:
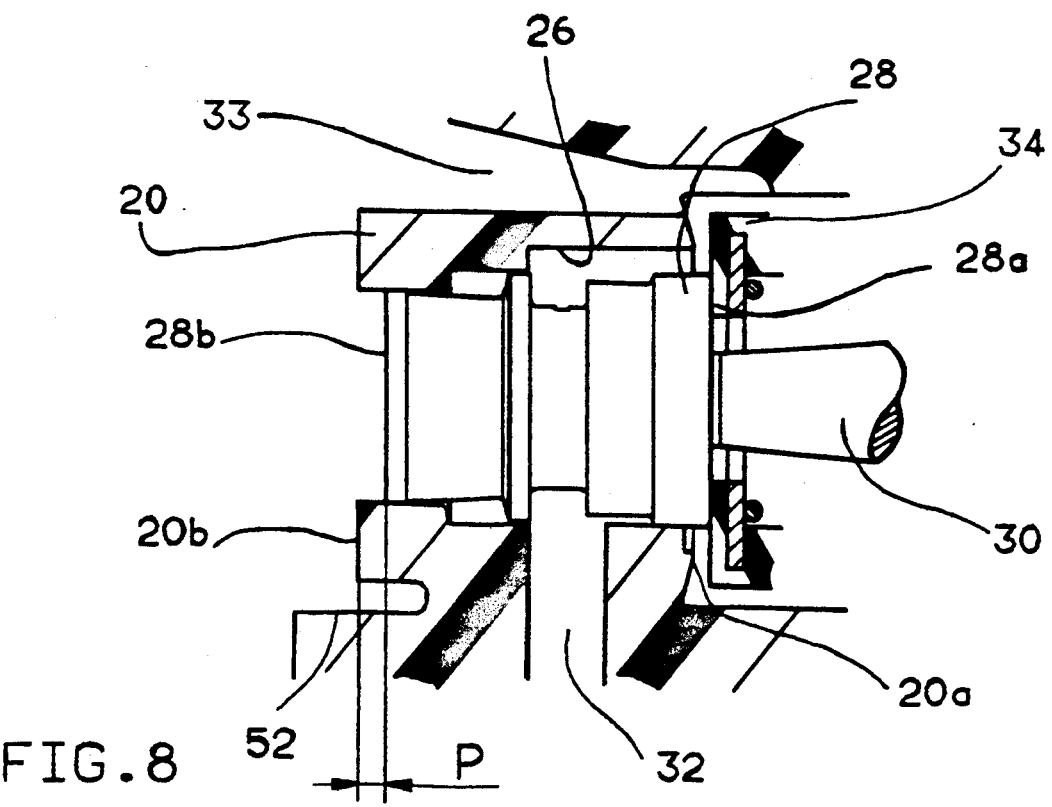
FIG. 8 is a view in longitudinal section, showing the valve plunger equipping the piston of the booster.

For this purpose, after the plunger 28 and the three-way valve have been assembled in the bore 26 of the piston 20, a force is exerted on the control rod 30, first of all to take up the initial idle stroke between the shutter 34 and the valve seat 20a formed on the piston 20 (FIG. 8). At this moment, communication between the passages 32 and 33 is broken, and the front and rear chambers 16 and 18 are isolated from one another.

A slight additional force exerted on the control rod 30 will move the plunger 28 further forwards, so as to set the seat 28a apart from the shutter 34. The opening of this shutter can be detected easily, for example by measuring the leak between the space located behind the shutter 34 and the passage 32. In this position, the three-way valve is in its position of equilibrium corresponding to the jump of the booster, as explained above.

The assembly is then immobilized in this position, and the distance P between the plane of the annular front face 20b of the piston 20 and the front face 28b of the plunger 28 is measured. According to the invention, this distance P must be equal to the distance D previously determined on the reaction disc 48, in order to ensure that the reaction disc 48/piston 20/plunger 28 assembly provides a booster of which the jump has the desired characteristics.

This can be obtained in a simple way either by machining the annular front face 20b of the piston 20 or by machining the front face 28b of the plunger 28 or by the addition of shims on the face 20b or on the face 28b or by a combination of the machining of one face and the addition of shims on the other, until the distance P is equal to D.

Once the distance P has been set, all that remains is to assemble the push rod 46, equipped with the reaction disc 48 by means of which the distance D has been measured, on the piston 20 and the plunger 28 which have just been machined, in order to obtain the booster having the requisite functioning.

The booster, once assembled, can then be equipped with the master cylinder by means of which $F_{SB}$ has been measured, in order to obtain an assembly which will have the requisite characteristics. This is as shown by experience where, for a large number of such assemblies, the curves of FIG. 6 have been plotted experimentally and where the spread of characteristics is virtually negligible and, at all events, well below the permitted tolerances.

A booster, the value of the jump of which is controlled by means of the process according to the invention, has therefore indeed been provided. Moreover, the process of the invention allows a unitary adjustment of the main components of the booster which govern the value of the jump. Finally, the booster so obtained will be perfectly suitable for actuating a particular master cylinder, namely the one by means of which the force $F_{SB}$ at which the booster is to execute the jump has been determined, and a pairing of a master cylinder and a booster has therefore indeed been obtained.

Of course, the invention is not limited to the embodiment just described by way of example, but embraces all its alternative versions. Thus, it will be appreciated that the invention applies to all brake boosters, whatever their particular structure. Likewise, the master cylinder can be characterized by a curve of the change of the actuating stroke as a function of the actuating force.

What we claim is:

1. A process for adjusting the value of the jump of a brake booster, in which is movably mounted a hollow boosting piston, a control rod carrying a plunger seated in the piston and a push rod, boosting means being controlled as a result of a forward movement of the plunger and the effect being to move the piston forwards, a reaction disc being interposed between an annular front face of the piston and a rear face of the push rod, the booster being intended for actuating a master cylinder, the process involving the following steps:

determining the force which the booster must exert on the push rod in order to actuate the master cylinder, exerting the force on the push rod equipped with the reaction disc, measuring the deformation of a central part of a rear face of the reaction disc, measuring the distance between the annular front face of the piston and the front face of the plunger when the boosting means is in a position of equilibrium, and making the distance equal to the deformation of the central part of the rear face of the reaction disc.

2. The process according to claim 1, wherein the force which the booster must exert on the push rod in order to actuate the master cylinder is determined as a function of a pressure which is desired in the brake circuit.

3. The process according to claim 1, wherein the force which the booster must exert on the push rod in order to actuate the master cylinder is determined as a function of an actuating stroke of the master cylinder.

4. The process according to claim 1, wherein in order to exert the force on the push rod equipped with the reaction disc, the push rod is arranged on a base having an annular front face identical to the annular front face of the piston.

5. The process according to claim 1, wherein the deformation of the central part of the rear face of the reaction disc is measured by the distance between first plane containing the annular front face and a second plane parallel to the first plane and tangent to a part of the reaction disc furthest away from the rear face of the push rod.

6. The process according to claim 1, wherein the distance between the annular front face of the piston and the front face of the plunger is made equal to the deformation by one of machining the annular front face of the piston and machining the front face of the plunger.

7. The process according to claim 1, wherein the distance between the annular front face of the piston and the front face of the plunger is made equal to the deformation by one of an addition of shims to the annular front face of the piston and an addition of shims to the front face of the plunger.

8. The process according to claim 1, wherein the distance between the annular front face of the piston and the front face of the plunger is made equal to the deformation by:
   machining one of the annular front face of the piston and the front face of the plunger, and
   an addition of shims to one of the annular front face of the piston the front face of the plunger.

* * * * *